COLOR TELEVISION RECEIVERS

Filed Sept. 14, 1954

INVENTORS
EDWIN M. HINSDALE, JR.
& FREDERICK B. SMITH, JR.
BY
[signature]
ATTORNEY 2,898,399

COLOR TELEVISION RECEIVERS

Edwin M. Hinsdale, Jr., Baldwin, and Frederick B. Smith, Jr., Oceanside, N.Y., assignors to Radio Corporation of America, a corporation of Delaware Application September 14, 1954, Serial No. 455,947

6 Claims. (Cl. 178—5.4)

This invention relates to a color television receiver, color information signal demodulation, and more particularly to systems for generating a color subcarrier reference wave for use in color television receivers.

In accordance with the standards for color television adapted by the Federal Communications Commission on December 17, 1953, the transmitted carrier includes image luminance components, color information in the form of a modulated subcarrier, and both deflection and color synchronizing signal information. The color synchronizing information takes the form of periodic bursts of signal oscillations at the frequency of the color subcarrier, and having a reference phase.

The present invention in its more general form provides a system for generating a color subcarrier reference wave having a frequency equal to the frequency of the color subcarrier which may be used to drive synchronous demodulators which in turn demodulate the chrominance information in the composite color video signal. An oscillator circuit is provided which has a frequency of oscillation of substantially 3.58 mc. or the frequency of the color subcarrier. There is provided an oscillation control circuit for varying the frequency of the oscillations. The signal oscillations generated by the oscillator circuit are coupled to a push-pull output circuit. The push-pull signals are coupled to a phase detector circuit in which the phases of the push-pull signals are compared periodically with the incoming burst signal, to form the control signal. The control signal is then coupled to the oscillation control circuit to maintain the phase of the signal oscillations generated by the oscillator circuit, such that there exists a predetermined phase relationship between the color subcarrier reference wave which is generated by the local oscillator circuit and the incoming color burst.

An object of this invention is to provide an improved color subcarrier reference signal wave generator in a color television receiver.

Other and incidental objects of this invention will be apparent to those skilled in the art from reading the following specification and on inspection of the accompanying drawings in which.

Figures 1, 2:
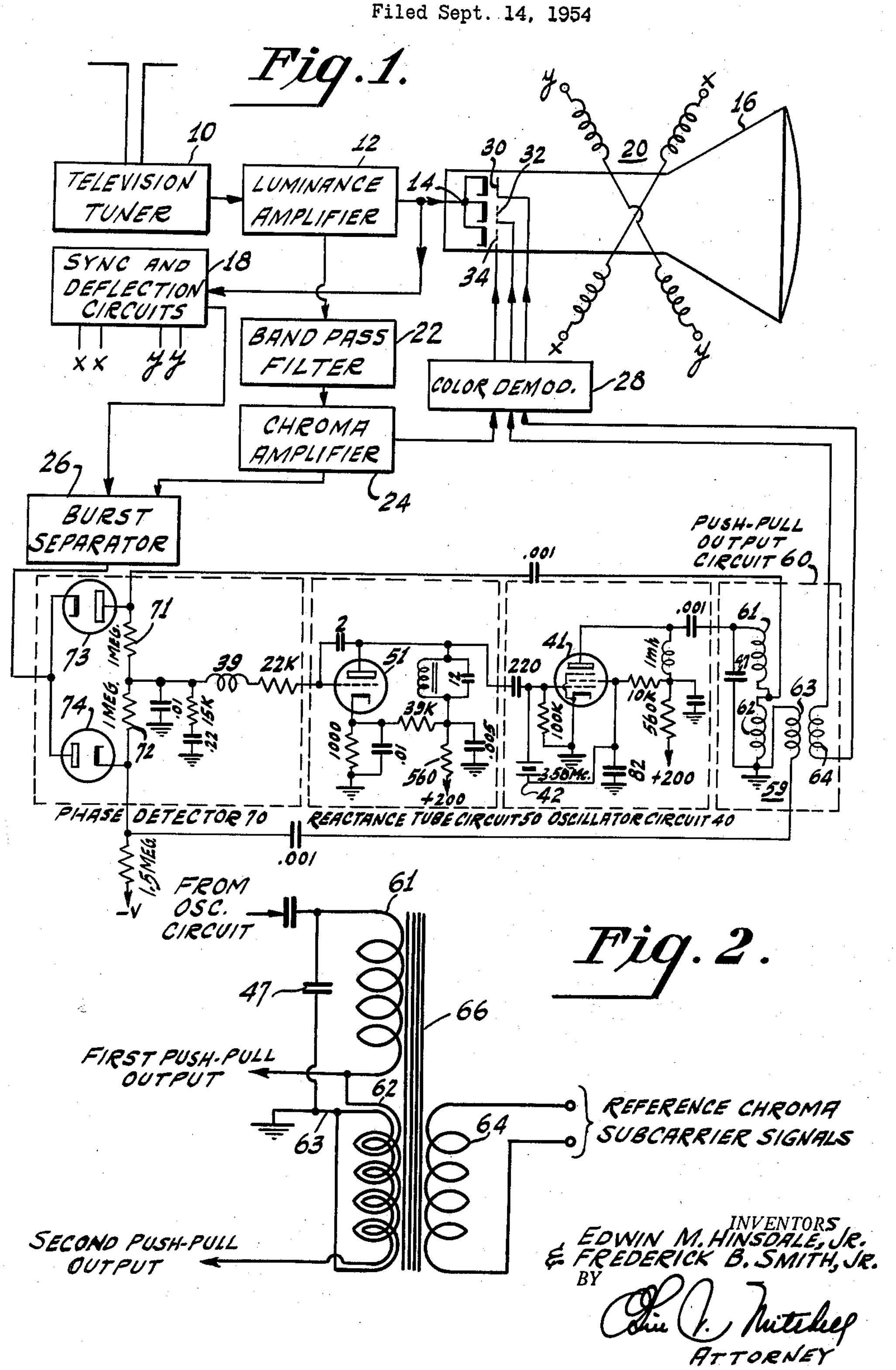
Figure 1 shows a combined block and circuit diagrammatic representation of a form of the invention.
Figure 2 shows a structural diagrammatic representation of a form of a push-pull output circuit which may be used in a form of the invention.

Referring now in detail to Figure 1 there is shown a television tuner 10 for receiving and detecting an incoming color video signal. Connected to the television tuner 10 is a luminance amplifier 12, for amplifying a luminance signal i.e., the signal which corresponds to the black and white brightness signal of monochrome television systems. The amplified luminance signal is then applied to the inter-connected cathodes 14 of a color kinescope 16. The color kinescope 16 is of the type which utilizes three color difference signals, to form the color image. Separate electron beams are provided in the color kinescope 16, for each of the different color difference signals.

The output signal of the luminance amplifier 12 is also applied to the deflection sync and deflection circuits 18, wherein energy is applied to the deflection coils 20 associated with the color kinescope 16. The deflection coils 20 act in such a manner as to cause the electron beams in the color kinescope 16 to scan the usual raster pattern.

The television tuner 10 is also coupled to a band pass filter 22, which serves to pass signals in a frequency band in the vicinity of the frequency of the color subcarrier frequency and to pass such signals constituting the chrominance signal on to a chroma amplifier circuit 24 and to the burst separator 26. The color burst is separated from the modulated color subcarrier signal in burst separator 26 responsive to a gating pulse provided by the sync and deflection circuits 18. The chroma amplifier 24 is also coupled to a color demodulator 28, wherein color difference signals are formed from the modulated color subcarrier signal.

A color demodulator circuit suitable for application here may be found in a co-pending patent application "Color Television" by Albert Macovski, RCA No. 39,959, or in an article entitled "Color Television Signal Receiver Demodulators," by Pritchard and Rhodes, which appeared in RCA Review, June 1953.

The color difference signals are applied to control grid electrodes 30, 32, and 34 of the color kinescope 16 to intensity modulate the electron beams in the kinescope 16 in accordance with the color information.

The formation of the color difference signals requires the generation at the color television receiver of a color subcarrier reference wave.

A crystal controlled oscillator 40 generates the color subcarrier reference wave of 3.58 megacycles. The phase of oscillator circuit 40 is adapted to be controlled by a reactance tube circuit 50. Signal oscillations of the oscillator circuit 40 are coupled to a push-pull output circuit 60 employing a transformer 59 having various windings, 61, 62, 63 and 64. Push-pull signal energy from the oscillator output circuit 60 is applied to a phase detector 70 wherein its phase is compared with the phase of the burst signals from the burst separator 26. A control signal is generated by the phase detector 70; this control signal has an amplitude depending on the phase between the burst signals and the color subcarrier reference wave developed by oscillator 40. The control signal is then coupled to the reactance tube circuit 50 wherein it tends to change the phase of the oscillator circuit 40 in such a manner as to maintain a proper phase relationship between the developed color subcarrier reference wave and the burst signal.

Winding 64 of the transformer 59 in the output circuit 40 couples the color subcarrier reference wave to the color demodulator 28, to be used to form the color difference signals from the modulated color subcarrier signals.

In regard to the operation of the system shown by Figure 1, the luminance signal from the luminance amplifier 12, may be added to the color difference signals either within color kinescope 16 or in circuit connected to the color kinescope 16 to form the color signals. In the system of Figure 1 the addition takes place within the color kinescope 16 when the color difference signals are applied to the control grids 30, 32, and 34 while the luminance signal is applied to the inter-connected cathodes 14. The addition of the luminance signal to the color difference signals results in color signals which are representative of colors in the image to be reproduced.

The demodulation of the color subcarrier signals to form the color difference signals takes place in the color demodulator 28.

The oscillator circuit 40 including a tube 41 acts to generate the reference color subcarrier reference wave used to drive the demodulators 28. The tube 41 has a cathode, a control grid and a screen grid which function as the electron coupled elements of the oscillator circuit. The electrical oscillations within the tube 41 are then electron coupled to a plate of the tube 41. The oscillator is frequency controlled by a crystal 42. A reactance tube 51 in the reactance tube circuit 50 appears as capacitive reactance to the crystal 42. Variations in the bias applied to a control grid of the reactance tube 51 vary the capacitive reactance presented by the tube 51. As the bias applied to the control grid of the reactance tube 51 is varied, the oscillations from the oscillator circuit 40 will also be varied due to the change in capacitance as viewed by the tube 41.

The output wave of the oscillator circuit 40 taken from the plate of the tube 41 is coupled to the push-pull output circuit 60. The transformer in the push-pull output circuit 60, which will later be described in structural detail, consists of a solenoid winding 61, a first bifilar winding 62, a second bifilar winding 63 and an isolating winding 64. The transformer in conjunction with a capacitor 47 forms an output tank circuit for the oscillator circuit 40. The functions of the push-pull output circuit include acting as a step-down transformer to effect improved impedance matching, and to provide a push-pull output, i.e., an output consisting of two voltages 180° with respect to each other. The push-pull output wave is necessary for the operation of the phase detector 70. The solenoid winding 61 and the first bifilar winding 62 may be thought of together as an auto-transformer, the primary voltage being applied across both of the windings 61 and 62, and the secondary voltage appearing across the first bifilar winding 62. Thus the first push-pull voltage is derived across the first bifilar winding 62. The second bifilar winding 63 is inductively coupled to the other windings and has induced within it a voltage which is 180° out of phase with the voltage appearing across the first bifilar winding 62. The second push-pull voltage is thus formed in phase opposition with the first push-pull voltage and appears across the second bifilar winding 63.

A voltage wave from the push-pull output circuit 60 is coupled to the phase detector 70 to be phase compared with the burst signal from the burst separator 26. The voltage wave is applied across resistors 71 and 72 at points connected to the plate of a diode 73, and the cathode of a diode 74 respectively. The burst is applied to the cathode of the diode 73 and the plate of the diode 74. It is to be noted that at the stable or equilibrium condition, the burst will be substantially 90 degrees out of phase with each of the push-pull voltages developed in the push-pull output circuit 60. Variations from this equilibrium condition will vary the voltage appearing between the resistors 71 and 72 and at a point 75. The voltage at the point 75 is coupled through a filtering circuit to a control grid of the reactance tube 51. The variations in voltage at the grid of the reactance tube 51 varies the oscillations of the oscillator circuit 40 and thereby maintains essentially a constant predetermined relationship between the phase of the oscillations of the oscillator circuit 40 and the phase of the oscillations of the burst.

In Figure 2 there is illustrated details of the transformer 59 which has solenoid winding 61, bifilar windings 62 and 63, and isolating winding 64. The first bifilar winding 62 and the solenoid winding 61 are serially connected in the form of auto-transformer windings. The second bifilar winding 63 is then inductively coupled to the solenoid winding 61 and the first bifilar winding 62 in such a manner as to have induced a voltage which is 180° out of phase with the voltage in the first bifilar winding 62.

The color subcarrier reference waves is taken from the isolating winding 64 which isolates such signals from D.C. voltages on other windings within the transformer 59. All the transformer windings 61, 62, 63 and 64 are placed on the same core. The phase of the color subcarrier reference wave may be controlled to some degree, if desired, by varying the coefficient of coupling of the isolating winding 64 in the transformer 59.

Having thus described the invention, what is claimed is:

1. In a color television receiver adapted to receive a color television signal including color synchronizing bursts having a prescribed frequency and phase, the combination of: an oscillator circuit to generate sinusoidal oscillations of substantially color burst frequency and having a plurality of windings which are bifilar wound and operatively connected to derive from said electrical oscillations a pair of oscillations which are 180° out of phase with respect to each other, a phase detector circuit operatively connected to develop a control voltage representative of the phase relationship between one signal and also opposite phases of a second signal as a result of said signals applied thereto, means to separate said color synchronizing bursts from said color television signal, means for applying said color synchronizing bursts and said pair of oscillations to said phase detector to develop a control voltage which is indicative of the relative phase between said burst and said electrical oscillations, a phase control means coupled to said oscillator circuit and operative to control the phase of said oscillations responsive to a control voltage applied to said phase control means, and means for applying said control signal to said phase control means for controlling the phase of the oscillations of said oscillator circuit.

2. In a color television receiver adapted to receive a color television signal including a chrominance signal and also color synchronizing bursts having a prescribed frequency and phase, a burst controlled oscillator comprising in combination: an oscillator circuit including apparatus to generate sinusoidal oscillations of substantially said color burst frequency, a phase control circuit connected to said oscillator circuit and operative to control the phase of said oscillations responsive to a control signal applied thereto, an oscillator output circuit coupled to said oscillator circuit and responsive to said sinusoidal oscillations and comprising a first solenoid winding serially connected to one winding of a second and third solenoid winding which are connected in series and which are bifilar wound to produce push-pull oscillations, said output circuit also including an isolating winding which is inductively coupled to said second and third windings, a phase detector circuit connected to receive said push-pull oscillations developed by said second and third windings, means to separate said color synchronizing bursts from said color television signal and to apply said separate bursts to said phase detector to develop therefrom a control voltage which is indicative of the relative phase relationship between said bursts and said electrical oscillations, means to apply said control signal to said phase control circuit for controlling the phase of the oscillations of said oscillator circuit, and color demodulator means operatively connected to said isolating winding and responsive to oscillations developed therein and also responsive to said chrominance signal to demodulate color information.

3. In a color television receiver adapted to receive a color television signal including color synchronizing bursts having prescribed frequency and phase, a burst synchronizing oscillator circuit comprising in combination: an oscillator circuit to develop electrical oscillations of substantially burst frequency, a two phase output circuit connected to said oscillator circuit and responsive to said electrical oscillations, said two phase output circuit including a transformer including a first and second winding wound with each winding turn and each adjacent winding turn belonging to said first and second windings respectively, said first and second windings commonly connected at one end of each winding and operatively responsive to said electrical oscillations to develop opposite phases of said electrical oscillations at the other ends of said windings, means to separate said color synchronizing bursts from said color television signal, a phase detector coupled to said burst separator and to said oscillator circuit and responsive to said opposite phases of said oscillations developed from said two phase output circuit and to said separated bursts for developing a control signal which is indicative of the phase relationship between said oscillations and said bursts, a phase control circuit coupled to said oscillator circuit for controlling the phase of said oscillations in response to a control signal applied thereto, and means for applying said control signal from said phase detector to said phase control circuit for maintaining phase relationship between said electrical oscillations of said oscillator circuit and said bursts.

4. In a color television receiver adapted to receive a color television signal including color synchronizing bursts having a prescribed frequency in phase, a color subcarrier reference wave generator comprising, in combination: an oscillator circuit adapted to generate sinusoidal oscillations at substantially said color burst frequency, means to separate said color synchronizing bursts from said color television signal, an output circuit for said oscillator circuit including a transformer having a first and second coil which are bifilar wound for transforming said electrical oscillations from said oscillator circuit into push-pull oscillations, a phase detector circuit connected to receive said push-pull oscillations and said separated color synchronizing bursts to generate therefrom a control signal which varies in accordance with any variation of phase between the phases of said bursts and said electrical oscillations, a phase control circuit connected to said oscillator to control the phase of said oscillations as a result of having a control voltage applied thereto, and means to apply said control signal to said phase control circuit for controlling the phase of the oscillations of said oscillator circuit.

5. In a color television receiver for receiving a composite color television signal including modulated color subcarrier waves and also including color synchronizing bursts of subcarrier frequency and reference phase, the combination comprising local subcarrier frequency oscillation generating means including an electron discharge device having a cathode, control grid, screen grid, suppressor grid, and anode, said suppressor grid being directly connected to said cathode, means for directly connecting said cathode to a point of reference potential, a piezo-electric crystal tuned to the subcarrier frequency, means for coupling said crystal between said control grid and said screen grid, a capacitor coupled between said screen grid and said point of reference potential, a parallel resonant circuit tuned to a frequency substantially equal to said subcarrier frequency, means for coupling said parallel resonant circuit between said anode and said point of reference potential, whereby said locally generated subcarrier frequency oscillations appear across said parallel resonant circuit; means for demodulating said modulated subcarrier waves, said demodulating means being coupled to said parallel resonant circuit; phase detector means coupled to said parallel resonant circuit for comparing said locally generated subcarrier frequency oscillations with said color synchronizing bursts to derive a control voltage representative of phase differences therebetween; a variable reactance device coupled to said phase detector means and responsive to said control voltage; and means for coupling said variable reactance device between said control grid and said point of reference potential.

6. Apparatus in accordance with claim 5 wherein the frequency of said subcarrier is approximately 3.58 megacycles, and wherein the value of said capacitor is of the order of 80 micro-microfarads.

References Cited in the file of this patent

UNITED STATES PATENTS

| | | |
|---|---|---|
| 2,477,074 | McIntosh | July 26, 1949 |
| 2,561,817 | Parker | July 24, 1951 |
| 2,645,717 | Massman | July 14, 1953 |
| 2,646,467 | McIntosh | July 21, 1953 |
| 2,740,046 | Tellier | Mar. 27, 1956 |
| 2,743,369 | Sands | Apr. 24, 1956 |

OTHER REFERENCES

R.C.A. Color Television Receiver, Model CT–100, March 1954, pages 32 and 33.

Disclaimer 2,898,399.—*Edwin M. Hinsdale, Jr.*, Baldwin, and *Frederick B. Smith, Jr.*, Oceanside, N.Y. COLOR TELEVISION RECEIVERS. Patent dated Aug. 4, 1959. Disclaimer filed Apr. 17, 1961, by the assignee, *Radio Corporation of America.*

Hereby enters this disclaimer to claims 5 and 6 of said patent.

[*Official Gazette May 23, 1961.*]